United States Patent
Machida (10) Patent No.: US 8,169,997 B2
(45) Date of Patent: May 1, 2012

(54) COMMUNICATION SYSTEM INCLUDING A BASE STATION AND TERMINAL DEVICES EACH USING AN UP-LINK LINE ALLOCATED BY THE BASE STATION

(75) Inventor: Mamoru Machida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 538 days.

(21) Appl. No.: 11/603,118

(22) Filed: Nov. 22, 2006

(65) Prior Publication Data

US 2007/0291680 A1    Dec. 20, 2007

(30) Foreign Application Priority Data

Jun. 20, 2006   (JP) ................................. 2006-169866

(51) Int. Cl.
  *H04J 3/06*   (2006.01)
(52) U.S. Cl. ..... 370/350; 370/329; 370/390; 370/395.3; 370/509; 455/450; 455/502; 455/509
(58) Field of Classification Search ............... 370/395.4, 370/203, 208, 210, 310, 322, 324, 328, 329, 370/331, 332, 338, 341, 348, 350, 390, 395.3, 370/500, 503, 510, 512–514; 455/3.01, 403, 455/422.1, 434, 435.1, 435.2, 436–444, 450, 455/452.1, 452.2, 453, 464, 502, 509, 524, 455/525, 550.1, 561
See application file for complete search history.

(56) References Cited

U.S. PATENT DOCUMENTS

| | | | |
|---|---|---|---|
| 6,366,779 | B1 | 4/2002 | Bender et al. |
| 6,704,932 | B1 * | 3/2004 | Matsunaga et al. ........... 725/126 |
| 6,741,861 | B2 | 5/2004 | Bender et al. |
| 6,954,634 | B1 * | 10/2005 | Bucknell et al. .............. 455/418 |
| 7,302,264 | B2 | 11/2007 | Yoon et al. |
| 7,551,937 | B2 | 6/2009 | Kim et al. |
| 7,630,719 | B2 | 12/2009 | Bender et al. |
| 7,664,087 | B2 * | 2/2010 | Cho et al. ........................ 370/338 |
| 7,751,363 | B1 * | 7/2010 | Etemad et al. ................. 370/329 |

(Continued)

FOREIGN PATENT DOCUMENTS

| | | |
|---|---|---|
| JP | 2002152812 | 5/2002 |
| JP | 2002525999 | 8/2002 |
| JP | 2005020153 | 1/2005 |
| JP | 2006-507753 | 3/2006 |
| WO | 2004100403 A1 | 11/2004 |
| WO | 2005008360 A2 | 1/2005 |
| WO | 2005122438 A1 | 12/2005 |

OTHER PUBLICATIONS

Chinese Office Action issued in 200610169007.1 dated Nov. 13, 2009. Notification of Reason for Rejection Japanese Office Action action dated Feb. 8, 2011, in corresponding Patent Application No. 2006-169866.
Office Action dated Nov. 15, 2011 issued in corresponding Chinese Patent Application No. 200610169007.1.

*Primary Examiner* — Anthony Addy
(74) *Attorney, Agent, or Firm* — Murphy & King, P.C.

(57) ABSTRACT

A communication system allocates a discrete line between a base station and each terminal device that allows discrete communication in a time span equivalent to several frames. The communication system includes a base station that has a processing function unit processing a physical layer using a given data format, and terminal devices each using an up-link line allocated by the base station. In the system, the base station and each terminal device communicates with each other by the orthogonal frequency division multiplexing method. The base station sends out a preamble signal cyclically, and has a means that sends out a vacant discrete connection identifier for identifying a vacant up-link line for a terminal device to send data to the base station when the base station receives an up-link line request from the terminal device.

7 Claims, 12 Drawing Sheets

U.S. PATENT DOCUMENTS

| | | | |
|---|---|---|---|
| 7,986,633 B2 * | 7/2011 | Ryu et al. | 370/252 |
| 8,018,969 B2 * | 9/2011 | Shim et al. | 370/476 |
| 2004/0117860 A1 * | 6/2004 | Yi et al. | 725/147 |
| 2004/0228350 A1 * | 11/2004 | Kuroda et al. | 370/395.4 |
| 2006/0114812 A1 | 6/2006 | Kim et al. | |
| 2006/0195767 A1 * | 8/2006 | Ihm et al. | 714/776 |
| 2007/0032255 A1 | 2/2007 | Koo et al. | |
| 2007/0099649 A1 * | 5/2007 | Han et al. | 455/525 |
| 2007/0160213 A1 * | 7/2007 | Un et al. | 380/270 |
| 2008/0039095 A1 | 2/2008 | Yoon et al. | |

* cited by examiner

| TERMINAL DEVICE'S NUMBER | Ranging Code | TRANSMISSION AREA |
|---|---|---|
| 0000 | 0 | 0 |
| 0001 | 1 | 0 |
| ... | ... | ... |
| 00FF | 255 | 0 |
| 0100 | 0 | 1 |
| ... | ... | ... |
| 0C00 | 255 | 12 |

| LATITUDE | LONGITUDE | Ranging Code | TRANSMISSION AREA |
|---|---|---|---|
| 00 : 00 : 0000 | 000:00:0000 | 0 | 0 |
| 00 : 00 : 0001 | 000:00:0000 | 1 | 0 |
| ⋮ | ⋮ | ⋮ | ⋮ |
| 00 : 00 : 0059 | 000:00:0000 | 59 | 0 |
| ⋮ | ⋮ | ⋮ | ⋮ |

| Ranging Code | TRANSMISSION AREA | DISCRETE CID |
|---|---|---|
| 0 | 0 | 100-115 |
| 1 | 0 | 116-12B |
| . | . | . |
| . | . | . |
| . | . | . |
| 255 | 12 | FFEA-FFFF |

COMMUNICATION SYSTEM INCLUDING A BASE STATION AND TERMINAL DEVICES EACH USING AN UP-LINK LINE ALLOCATED BY THE BASE STATION

CROSS-REFERENCE TO RELATED APPLICATIONS

This application is based upon and claims the benefit of priority from the prior Japanese Patent Application No. 2006-169866, filed on Jun. 20, 2006, the entire contents of which are incorporated herein by reference.

TECHNICAL FIELD

The present invention relates to a communication system that allocates a discrete line in carrying out communication using a WiMAX (World Interoperability for Microwave Access) format.

BACKGROUND ART

According to a WiMAX method, a cellular system is constructed by establishing individual communication area having a cell radius of several hundreds meters. According to IEEE standard 802.16-2004, a WiMAX-based system employs a modulation method of orthogonal frequency division multiplexing (OFDM), which provides frequencies divided in terms of time to be usable for each data communication.

According to IEEE standard 802.16e, which is related to a mobile broadband system, a WiMAX-based system employs an orthogonal frequency division multiple access (OFDMA) method, which allows data division using subcarriers, in addition to data division by time according to the OFDM method. Base stations and terminal devices are in a master-and-slave relation, where the base stations carry out line allocation, etc.

A system employing the OFDM method is disclosed, for example, in Published Japanese Translation of PCT International Publication for Patent Application 2006-507753. The disclosed system is such a mobile communication system that a down-link subframe contains a synchronization preamble and a search preamble to enable synchronization in time and frequency and more efficient cell searching.

Figure 1:
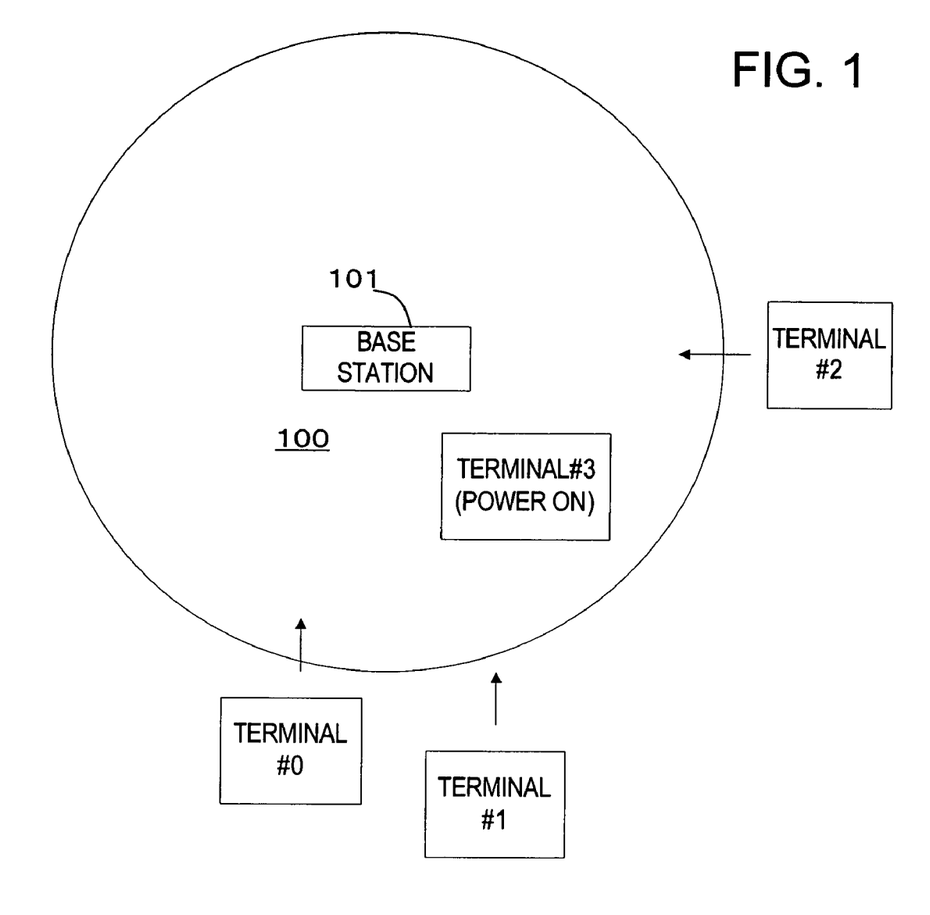
FIG. 1 is a structural example of a communication system using a WiMAX method.

FIG. 1 is a structural example of a communication system using the WiMAX method.

A cellular system is constructed by establishing a communication area of a cell 100 having a cell radius of several km or more with a base station 101 at the center, according to the WiMAX method. Mobile terminal devices #0 to #n come in and out of such a communication area as the cell 100. A number of sequence processes, which includes power supply sequence, initial setting sequence, and call sequence, are executed on the mobile terminal devices #0 to #n located within the communication area.

SUMMARY OF THE INVENTION

In a system based on the WiMAX method, a time for establishing a link takes several seconds or longer due to such procedures and authentication in establishing a line as the above sequences of initial setting, call, etc. This raises a possibility that a mobile terminal device may gets out of a communication area while trying to establish a link if the cell radius of the communication area is about several hundreds meters.

Accordingly, the object of the present invention is to provide a communication system characterized by a method for allocating a discrete line between a base station and each terminal device that allows discrete communication in a time span equivalent to several frames.

To achieve the above purpose, the feature of the present invention lies in reviewing an operational flowchart of communication between a base station and a terminal device, and establishing a rule of a selection method for a request signal in a communication system.

In a first aspect of the invention, a communication system in a specific form includes a base station having a processing function unit that processes a physical layer using a given data format; and terminal devices each using an up-link line allocated by the base station, wherein the base station and each terminal device communicates with each other by an orthogonal frequency division multiplexing method, the base station comprising a transmitting unit that sends out a preamble signal periodically, the base station having a means that sends out a vacant discrete connection identifier for identifying a vacant up-link line for a terminal device to send data to the base station when the base station receives an up-link line request from the terminal device, and each of the terminal device synchronizing with the base station by a preamble signal from the base station, the terminal device comprising: a transmission unit sending an up-link line request to the base station on the basis of an up-link line request code and a transmission area that correspond to a device number of the terminal device; a storage unit storing a connection identifier on use included in up-link line allocation information sent from the base station; and a detection unit recognizing up-link line allocation information sent from the base station, the allocation information being sent as a replay to the up-link request, and distinguishing the stored connection identifier from a connection identifier added by the up-link line allocation information to recognize a connection identifier aimed at the terminal device, wherein the terminal device causes the line request transmission unit to send an up-link line request again when the terminal device cannot recognize the connection identifier.

This communication system allows discrete communication in a time span of several frames.

The above communication system may have such a constitution that the terminal device adds the recognized connection identifier aimed at the terminal device and the terminal device's number to a first up-link line burst when sending the first up-link line burst to the base station after recognizing the connection identifier aimed at the terminal device.

This allows the base station to understand which terminal device is sending a request.

The communication system may have such a constitution that the base station receives and recognizes the connection identifier aimed at the terminal device and terminal device's number, which are sent from the terminal device, and adds a connection identifier aimed at the terminal device to down-link line allocation information in a broadcast signal so as to send discrete data to the terminal device.

This allows the communication system having the above constitution to execute discrete communication also in a down-link line.

In the first aspect, the communication system may have such a constitution that the terminal device has a means that sends an up-link line request to the base station on the basis of an up-link line request code and a transmission area that correspond to location information of the terminal device.

Since the possibility of locational coincidence between a plurality of terminal devices is extremely low, the collision of request signals from the terminal devices is prevented.

In the first aspect, the communication system may have such a constitution that the base station causes the vacant discrete connection identifier sending means to set a vacant discrete connection identifier according to the numerical order of identifiers and send the set identifier to a terminal device.

In the first aspect, the communication system may have such a constitution that the base station causes the vacant discrete connection identifier sending means to send a plurality of discrete connection identifiers to a terminal device, the identifiers being grouped in correspondence to up-link line request codes and transmission areas, when the base station sends a vacant discrete connection identifier to the terminal device. The terminal device recognizes a discrete connection identifier aimed at the terminal device among the received group of discrete connection identifiers by referring to the up-link line request codes and the transmission areas.

This allows the base station to discriminate one request signal from another in a simple manner when a plurality of terminal devices sends request signals at the same timing.

PREFERRED EMBODIMENTS OF THE PRESENT INVENTION

Embodiments of the present invention will now be described referring to the drawings. The embodiments are described to facilitate understanding of the present invention, and are not intended to limit the technical scope of the present invention.

Figure 2:
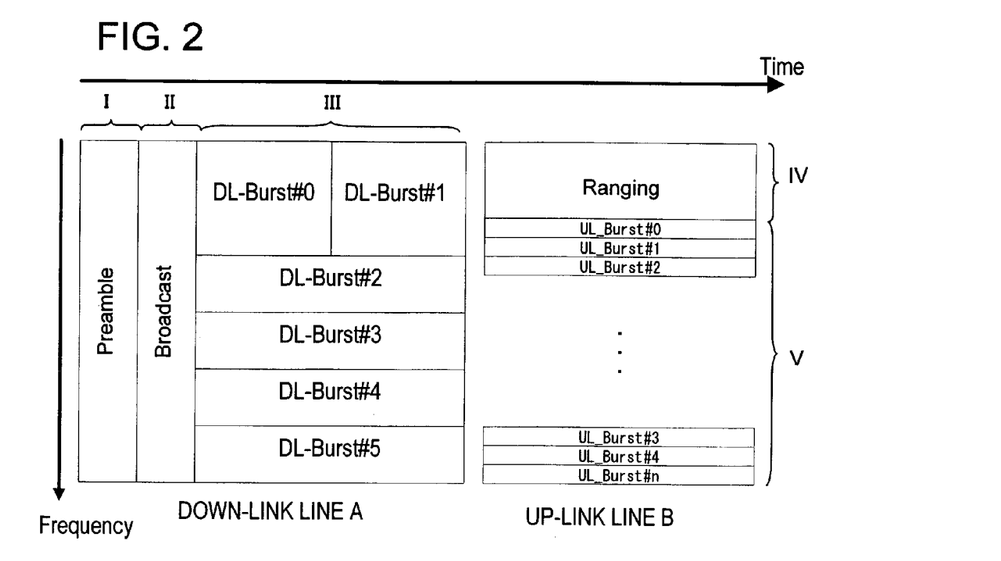
FIG. 2 is a structural example of a frame format of an OFDMA physical layer applies to the present invention.

FIG. 2 is a structural example of a frame format of an OFDMA physical layer applies to the present invention. The vertical axis represents the logic numbers of subchannels, and the horizontal axis represents the numbers of OFDM symbols. A subframe for a down-link line A is composed of a preamble I, a broadcast message II which includes a frame control header (FCH), down-link line allocation information (DL_MAP), and up-link line allocation information (UL_MAP), and a plurality of down-link data bursts III. A subframe for an up-link line B is composed of a bandwidth request signal (Ranging) IV, and a plurality of up-link data bursts V.

The preamble I includes synchronization (sync) data for the reception side to synchronize the reception side with the down-link line subframe in frequency and time, and is sent out thorough every channel simultaneously. A plurality of types of preambles are prepared, and every preamble has a certain length.

The frame control header FCH in the broadcast message II prescribes the profile (coding method, length, etc.) of the first burst following the header. The down-link line allocation information (DL_MAP) includes mapping information of data bursts in the down-link subframe, and the up-link line allocation information (UL_MAP) includes mapping information of data bursts in the up-link subframe.

Each data burst is made of an integral number of OFDM symbols, and is processed by an allocated modulation method (QPSK (Ouadri Phase Shift Keying), 16 QAM (Quadrature Amplitude Modulation), 64 QAM), a coding method, and a coding rate that accords with a burst profile prescribed by the down-link line allocation information (DL_MAP).

The preamble I is modulated by BPSK (Binary Phase Shift Keying), and the broadcast message is modulated by GPSK.

Figure 3:
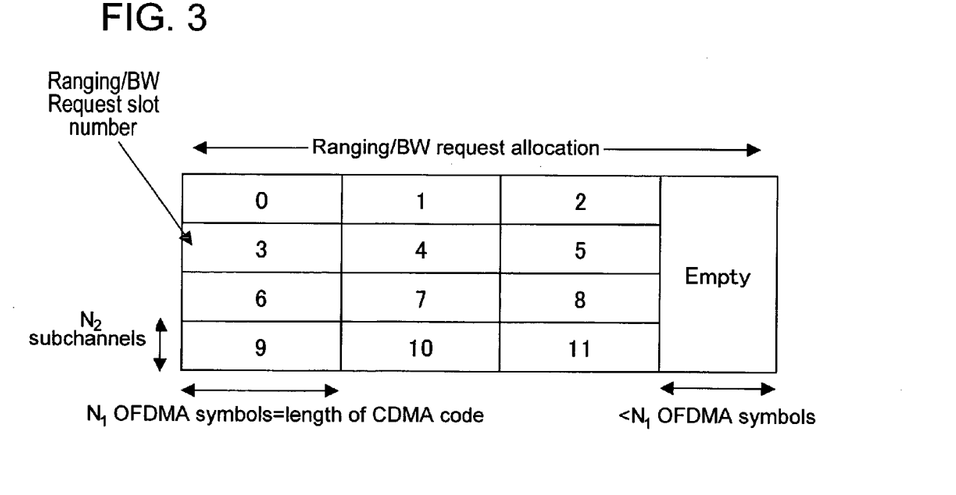
FIG. 3 is a graphic diagram of transmission areas for a band width request signal (Ranging).

FIG. 3 is a graphic diagram of transmission areas for a band width request signal (Ranging). A table shown in FIG. 3 has 12 request slot areas according to IEEE standard 802.16e.

Figure 4:
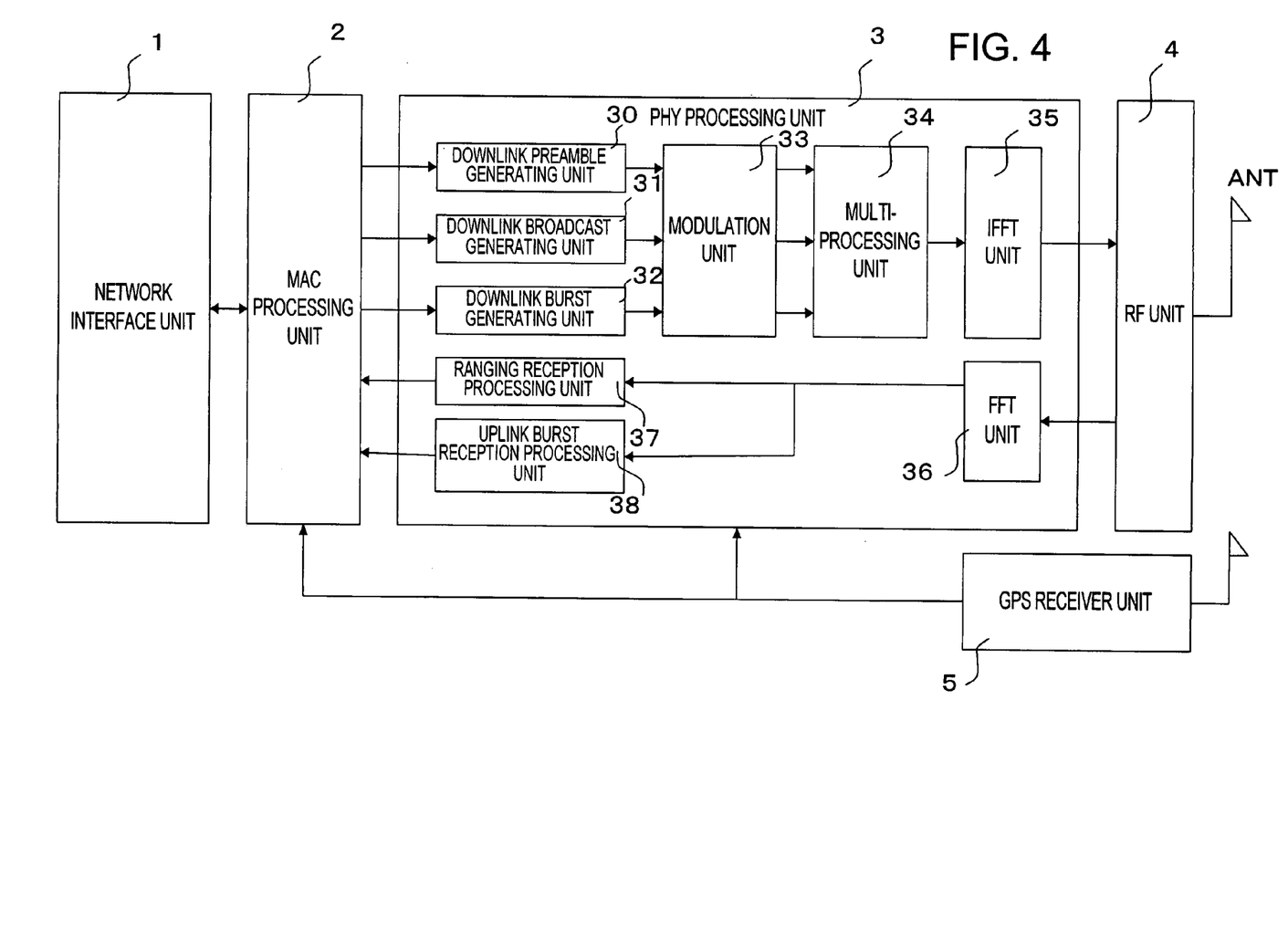
FIG. 4 is a block diagram of a structural example of a base station according to the present invention.
Figure 5:
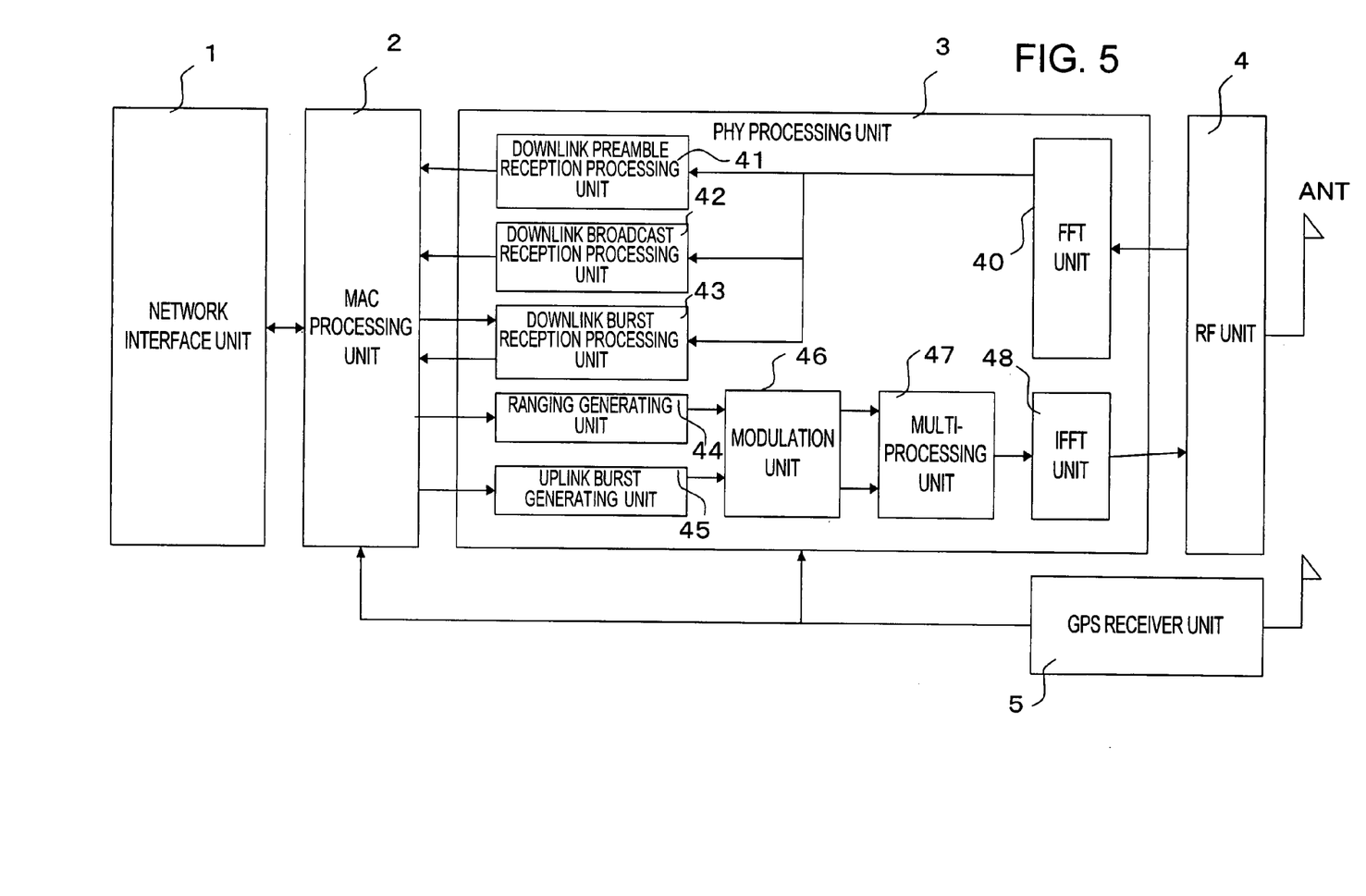
FIG. 5 is a block diagram of a structural example of a terminal device according to the present invention.

FIGS. 4 and 5 are block diagrams of structural examples of a base station 101 and terminal devices #0 to #n according to the present invention. Both base station and terminal device have a bidirectional transmission/reception function, thus have the identical transmission/reception circuits. The components having the same function in the base station and terminal device, therefore, are denoted by the same reference numerals for convenience.

As shown in FIG. 4, the base station includes a network interface unit 1, a media access control (MAC) processing unit 2, a physical layer (PHY) processing unit 3, a radio frequency (RF) transmitting/receiving unit 4, and a GPS receive unit 5.

The network interface unit 1 has an interface function of interfacing with external equipment, and a transmission/reception function for data exchange with the MAC processing unit 2. The MAC processing unit 2 has a resource management function, and an MCA layer function according to the WiMAX standard.

The PHY processing unit 3 includes a down-link preamble generating unit 30 that generates a preamble pattern, a down-link broadcast generating unit 31, a down-link burst generating unit 32, a modulation processing unit 33, a multiplexing (MUX) unit 34, and an inverse fast Fourier transformation (IFFT) unit 35.

The down-link preamble generating unit 30 generates a preamble symbol according to an instruction from the MAC processing unit 2. The down-link broadcast generating unit 31 generates given broadband data out of transmission data from the MAC processing unit 2 and executes a PHY layer process on the transmission data according to an instruction from the MAC processing unit 2. The down-link burst generating unit 32 executes a PHY layer process on the transmission data according to an instruction from the MAC processing unit 2.

The modulation processing unit 33 modulates a signal from each generating unit by QPSk, BPSK, multivalue modulation, etc. The multiplexing unit 34 multiplexes the signal from each generating unit according to a use area (multiplexing format) instruction from the MAC processing unit 2.

The inverse fast Fourier transformation (IFFT) unit 35 executes inverse fast Fourier transformation, etc according to parameters specified by the MAC processing unit 2. Transformed output from the inverse fast Fourier transformation unit 35 is then converted in frequency by the RF unit 4 into a radio frequency signal, which is sent out from an antenna ANT.

The PHY processing unit 3 has a reception function unit that processes a signal received and demodulated at the RF unit 4. The reception function unit consists of a fast Fourier transformation (FFT) unit 36, an up-link burst receiving/processing unit 38, and a Ranging receiving/processing unit 37.

The fast Fourier transformation (FFT) unit 36 executes fast Fourier transformation, etc. The up-link Ranging receiving/processing unit 37 executes a PHY process according to the WiMAX standard, and sends a reception result to the MAC processing unit 2.

The up-link burst receiving/processing unit 38 executes the PHY process on an area specified by the MAC processing unit 2, and sends a reception result to the MAC processing unit 2.

The GPS receive unit 5 shown in FIG. 4 generates an internal timing cycle synchronizing with a GPS clock, which is not shown.

The structure of a terminal device shown in FIG. 5 will then be described. The terminal device includes a network interface unit 1, a MAC processing unit 2, a PHY processing unit 3, a radio frequency (RF) transmitting/receiving unit 4, and a GPS receive unit 5.

The network interface unit 1 has an interface function of interfacing with external equipment, and a transmission/reception function for data exchange with the MAC processing unit 2. The MAC processing unit 2 has a resource management function, and an MCA layer function according to the WiMAX standard.

The function of the MAC processing unit 2 is changed from a function conforming to the WiMAX specification in accordance with the embodiments of the present invention to be described below. In a resource management process, the MAC processing unit 2 recognizes a code number sending out in making a line request (Ranging), an area instruction, and a burst signal transmission location, which are included in a broadcast signal, and reports the recognized code number, area, and transmission location to the PHY processing unit 3.

The PHY processing unit 3 has a transmission function and a reception function. The transmission function is provided by a Ranging generating unit 44, an up-link burst generating unit 45, a modulation processing unit 46, a multiplexing unit 47, and an IFFT unit 48.

In FIG. 5, the Ranging generating unit 44 generates a line request code (Ranging Code) according to an instruction from the MAC processing unit 2. The up-link burst generating unit 45 generates a burst signal. The modulation processing unit 46 modulates a signal from each generating unit by QPSk, BPSK, multivalue modulation, etc. The multiplexing unit 47 multiplexes the signal from each generating unit according to a use area instruction from the MAC processing unit 2.

The inverse fast Fourier transformation unit 48 executes inverse fast Fourier transformation, etc according to parameters specified by the MAC processing unit 2.

The reception function is provided by a fast Fourier transformation (FFT) unit 40, a down-link preamble receiving/processing unit 41, a down-link broadcast receiving/processing unit 42, and a down-link burst receiving/processing unit 43. The fast Fourier transformation (FFT) unit 40 executes fast Fourier transformation, etc. The down-link preamble receiving/processing unit 41 has a function of detecting a preamble signal sent from the base station 101, and synchronizing the terminal device with the base station. The down-link preamble receiving/processing unit 41 also has a function of reporting the synchronization timing to the down-link broadcast signal receiving/processing unit 43 and to the MAC processing unit 2.

The down-link burst signal receiving/processing unit 43 has a function of executing a reception process on internal information according to the WiMAX standard, and reporting the processed internal information to the MAC processing unit 2. The down-link burst signal receiving/processing unit 43 is informed of the contents of a broadcast signal via the MAC processing unit 2, and executes a reception process on an area informed of according to the WiMAX standard.

The RF unit 4 has a reception/transmission function of modulating a base band signal from the PHY processing unit 3 into an RF signal, or demodulating the RF signal into a base band signal. The GPS receive unit 5 reports location information to the MAC processing unit 2.

Embodiments of a line allocation method according to the present invention will be described. The method is executed for the base station 101 and the terminal devices #1 to #10 that have such a structure as shown in FIGS. 4, 5.

Figure 6:
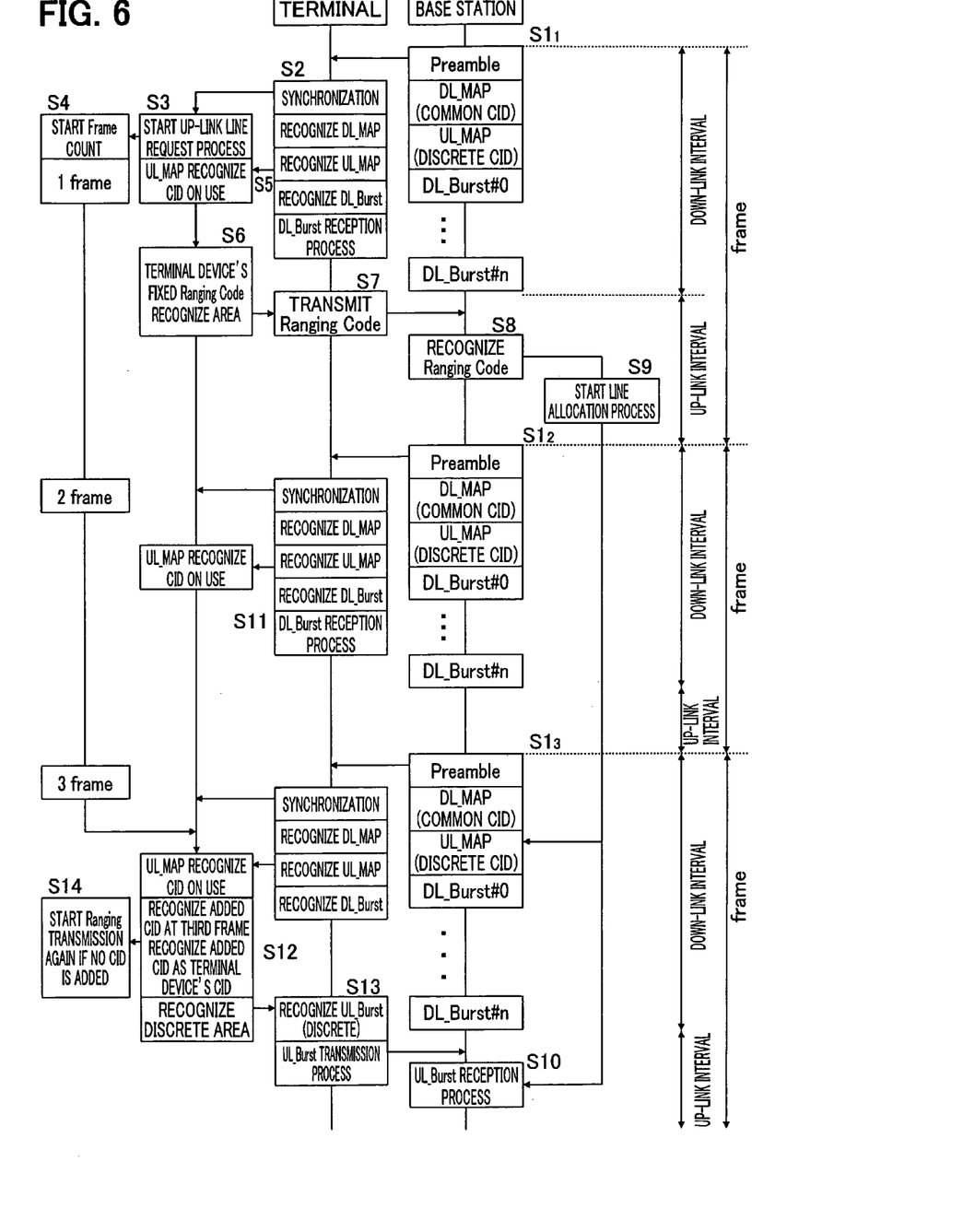
FIG. 6 is a graphic diagram of an operational flow according to a first embodiment of the present invention.

FIG. 6 is a graphic diagram of an operational flow according to a first embodiment of the present invention.

The base station 101 sends out a preamble signal cyclically in the WiMAX-based data format as shown in FIG. 2 (step $S1_1, S1_2, S1_3$ - - - ). The cycle of preamble signal transmission is equivalent to the length of one frame. According to the present embodiment, the down-link line A is dedicated for broadcast-type information received by every terminal device.

A connection identifier (CID) for identifying a vacant up-link line, which identifier can be recognized by every terminal device, is prepared as a common CID in a down-link line allocation area (DL_MAP), and each terminal device is informed of the common CID in a broadcast signal.

The base station 101 sends out data aimed at every terminal device by storing the data in a common CID area in the down-link (DL) burst signal informing of the CID.

A terminal device receives the preamble signal sent from base station 101, and synchronizes the terminal device with the base station (step S2). Upon establishing synchronization with the base station, the terminal device starts an up-link line request (ranging) process (step S3).

The terminal device then operates a frame counter in the MAC processing unit 2 (step S4). At the same time, the terminal device recognizes and memorizes a discrete CID in up-link line allocation information (UL_MAP), which is information included in a broadband signal (step S5).

Figure 7:
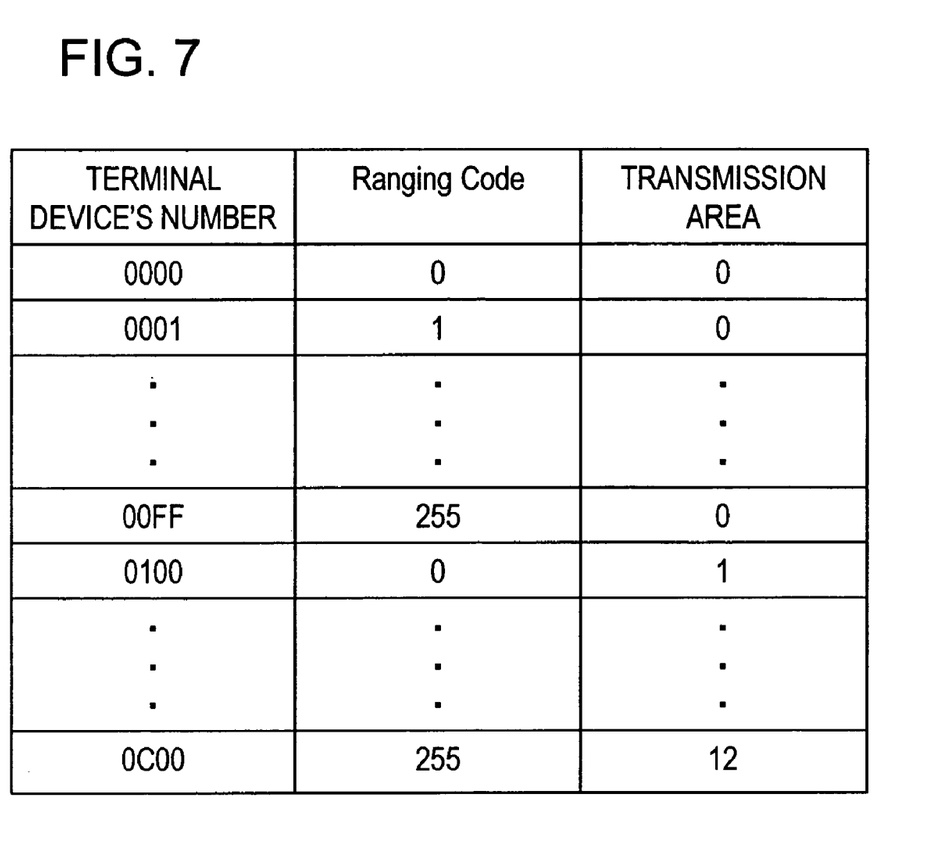
FIG. 7 is a graphic diagram of one example of a Ranging transmission corresponding list.

The terminal device, based on its own fixed number, refers to a corresponding list (Ranging transmission corresponding list) relating request codes (Ranging code) to transmission areas (step S6), and sends a fixed Ranging code according to the format of the up-link line B shown in FIG. 2 (step S7). An instance of the fixed Ranging transmission corresponding list is shown in FIG. 7. The list exhibits the terminal device's codes in the left column, Ranging codes (256 kinds) in the middle column, and transmission areas in the right column (12 areas shown in FIG. 3). The list, therefore, allows the determination of a specific Ranging code for each of 3072 (=256×12) terminal devices.

Timing for sending a Ranging code is the timing at which the Ranging code corresponds to a Ranging transmission area shown in FIG. 3, for which the up-link line B is specified.

When the base station 101 recognizes a Ranging code sent from the terminal device (step S8), the base station 101 starts a line allocation process (step S9).

In the line allocation process, for example, a vacant CID to be sent out is determined according to the increasing order of the number of identifiers. A determined result is reported to the terminal device by a broadcast signal that is transmitted after two frames have passed since the reception of the Ranging code (step S13). A reception process on a reported line allocation area is executed in the up-link line B for a reporting frame (step S10). Reporting the vacant CID by the broadcast signal transmitted two frames after the reception of the Ranging code is due to consideration of a case where a reporting process does not finish in time after one frame has passed.

Meanwhile, the terminal device receives the burst signal (broadcast signal) in the down-link line A from a down-link burst area (DL_Burst) on the basis of down-link line allocation information (DL_MAP).

The terminal device then checks a discrete CID in the up-link line allocation information (UL_MAP) at third frame from Ranging code transmission on the basis of a count of the frame counter. If the checked discrete CID shows a difference from the memorized discrete CID on use, the checked CID is the one allocated to the terminal device, so that the terminal device recognizes a specified area (step S12). The terminal device sends information from the terminal device using the recognized up-link line burst area (UL_Burst) (step S13).

When no additional discrete CID is provided, the terminal device starts ranging transmission again (step S14). The number of frames to pass before transmission of the terminal device information is not limited to 3 as shown in FIG. 6. Three frames is merely one instance.

The process according to the present invention as shown in FIG. 6 enables the start of discrete communication within a time span of several frames.

A second embodiment is provided as a modification of the present invention in comparison with the first embodiment. The second embodiment allows a base station to identify a terminal device that carries out Ranging transmission. The description of the second embodiment will be made referring to an operational flow shown in FIG. 8.

Figure 8:
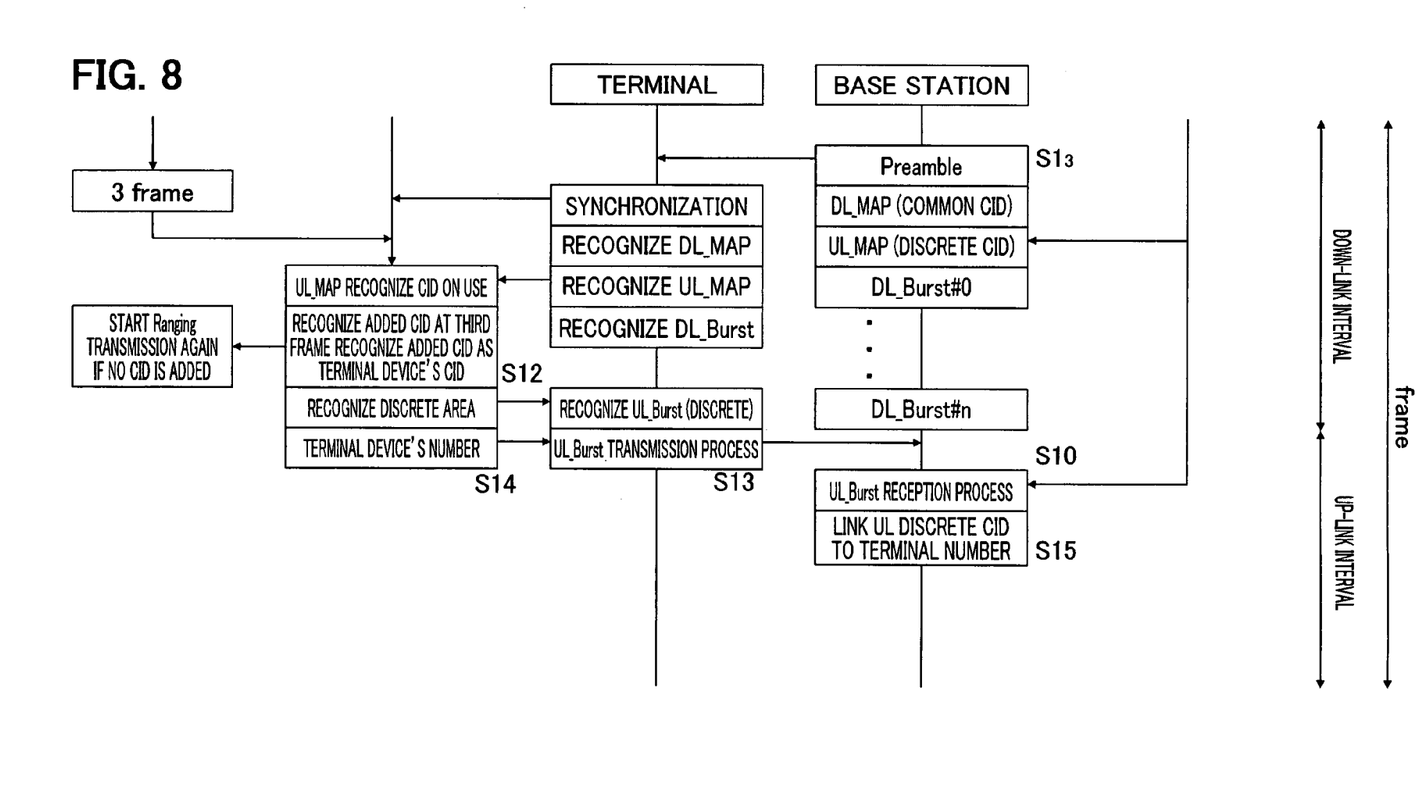
FIG. 8 is a graphic diagram of an operational flow according to a second embodiment of the present invention.

A process shown in FIG. 8 is a part of the operational flow shown in FIG. 6 that is extracted as the part relevant to the second embodiment.

The operational flow shown in FIG. 8 includes an additional process for a terminal device to add its own device number and a recognized discrete CID to up-link information to send (step S14) when the terminal device sends the first up-link line burst UL_Burst (step S13) after recognizing the discrete CID (step S12).

The base station 101, therefore, receives information linking the UL discrete CID to the terminal device number (step S15) when receiving the up-link line burst UL_Burst (step S13).

The base station 101 has a function of relating a received terminal device number to a discrete CID allocated by the base station to the terminal device (see FIG. 8). In the embodiment shown in FIG. 6, therefore, the base station 101 not only allocates a line, but also recognizes which terminal device is using the line.

Figure 9:
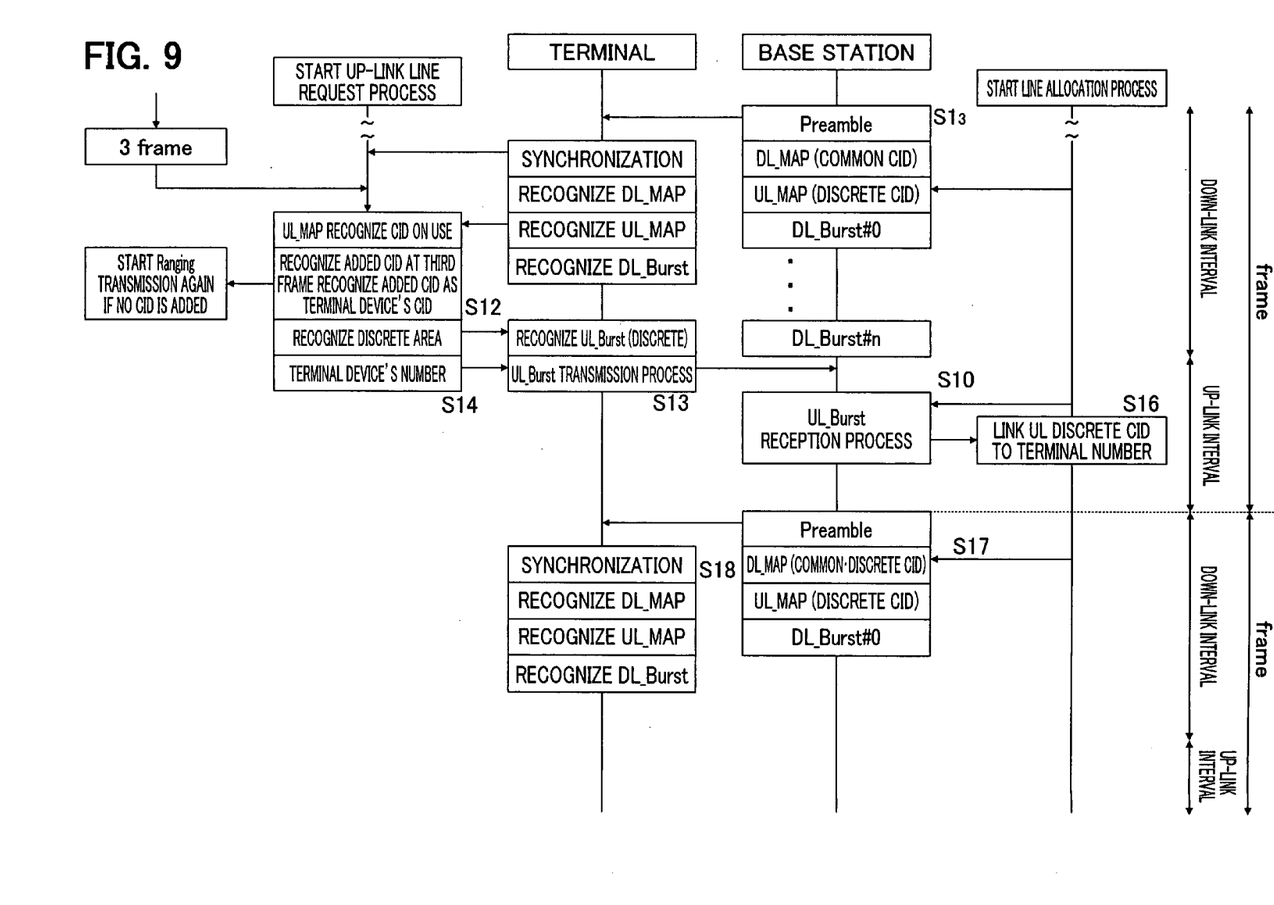
FIG. 9 is a graphic diagram of an operational flow according to a third embodiment of the present invention.

FIG. 9 exhibits an operational flow according to another embodiment, i.e., a third embodiment. According to the third embodiment, which is different from the second embodiment, the base station 101 recognizes information of a received discrete CID and a terminal device number, which are sent from a terminal device, and adds a discrete CID to down-link line allocation information (DL_MAP) in a broadcast signal to send discrete data to the terminal device.

An operational flow shown in FIG. 9 is a part of the operational flow shown in FIG. 6 that is extracted as the part relevant to the third embodiment.

Usually, discrete CIDs in the up-link line B and the down-link line A are not the same, but the same CID is used in the present invention. A down-link line burst (DL_Burst) in the down-link line A is allocated to the additional discrete CID (step S16), and the discrete information is sent in the down-link line burst (DL_Burst) (step S17).

The terminal device confirms the presence of the CID having the same number as the discrete CID allocated by the down-link line allocation information (DL_MAP), and receives the discrete information in the down-link line A (step S18). Another discrete CID may be allocated to the terminal device in the next frame in consideration of a link process on a base station's internal network.

Figure 10:
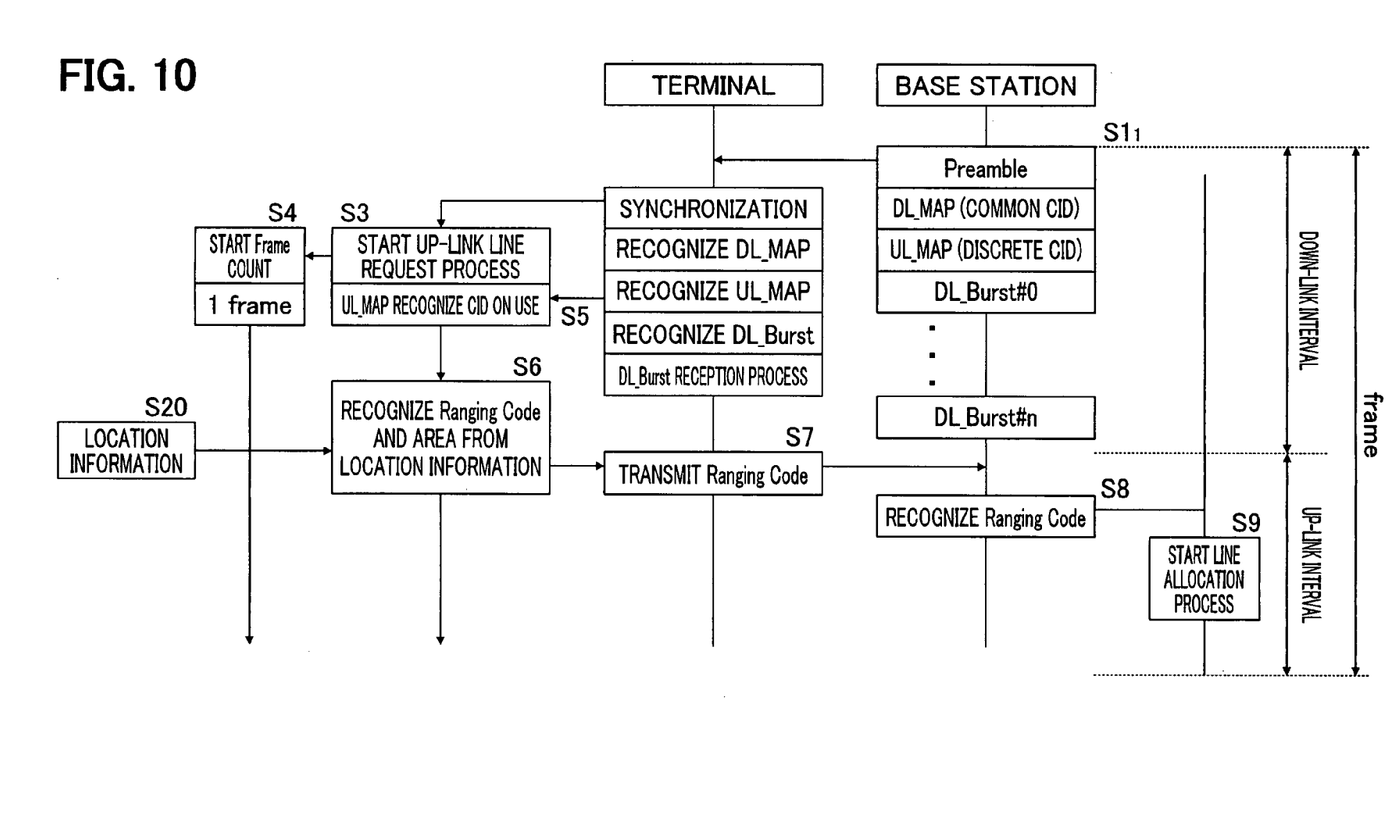
FIG. 10 is a graphic diagram of an operational flow according to a fourth embodiment of the present invention.

FIG. 10 exhibits an operational flow of another embodiment offering an additional characteristic. Like the previous embodiment, the operational flow is a part of the operational flow shown in FIG. 6 that is extracted as the part relevant to this embodiment.

Figure 11:
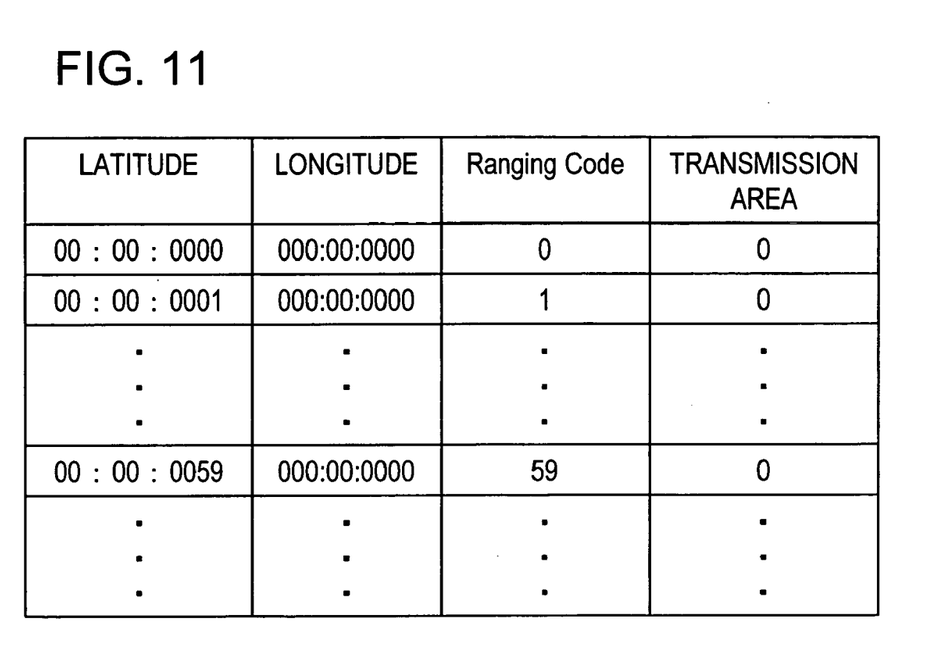
FIG. 11 is a graphic diagram of a corresponding list relating latitude/longitude information on the location of a terminal device to Ranging codes and transmission areas according to a fourth embodiment of the present invention.

According to the present embodiment, for example, location information, which is a parameter changing in response to the move of a mobile terminal device, is added to Ranging codes and transmission areas (step S20). A corresponding list including the location information is shown in FIG. 11. Based on the corresponding list, the location of a terminal device is identified by latitude/longitude information obtained by the GPS receive unit 5 referring to a GPS system. The terminal device, therefore, determines a Ranging code and a transmission area using the latitude/longitude information, instead of using the terminal device's number, and sends a Ranging signal (step S7).

A possibility of overlapping latitude/longitude of terminal devices is extremely low. The present embodiment thus prevents the collision of line request signals.

FIG. 11 exhibits a process flow of a still another embodiment, which is an instance of a partial modification of the process according to the first embodiment. In contrast to the first embodiment, according to which a discrete CID is determined in the increasing order of the numbers of CIDs in the line allocation process in the base station 101, this embodiment offers a method of determining a discrete CID on the basis of a combination of a Ranging code and a transmission area, which are sent from a terminal device.

Figure 13:
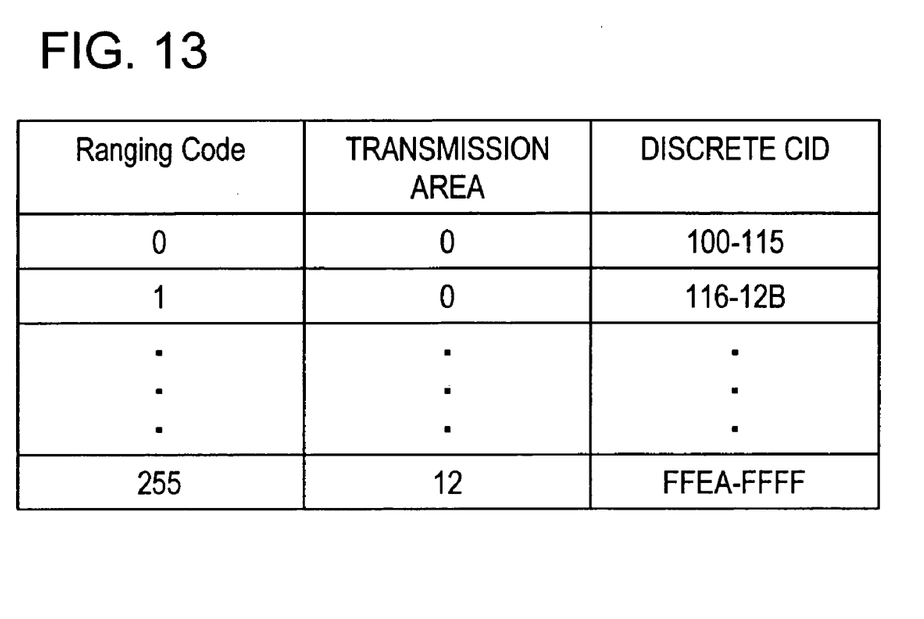
FIG. 13 is a discrete CID corresponding list applies to the fifth embodiment.

FIG. 13 exhibits a discrete CID corresponding list. In the list shown in FIG. 13, combinations of Ranging codes (0 to 255) and transmission areas (12 kinds) are related in correspondence to a group of discrete CIDs.

Figure 12:
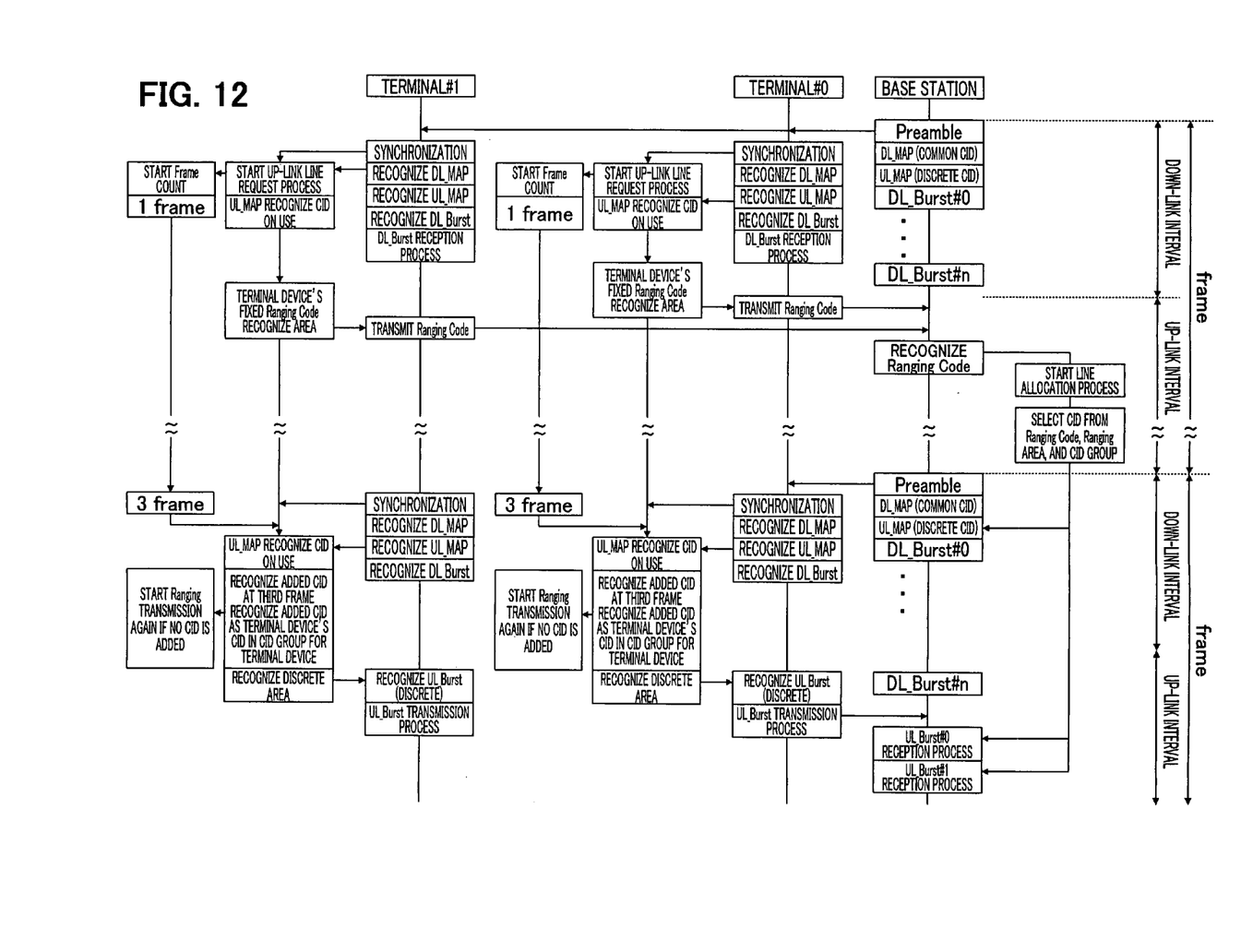
FIG. 12 is a graphic diagram of an operational flow according to a fifth embodiment of the present invention.

In the operational flow shown in FIG. 12, when a plurality of terminal devices (#0 and #1) send Ranging codes (step S7a, S7b) and the base station 101 receives the Ranging codes in the same frame period (step 8) according to the procedure shown in FIG. 6, the base station 101 sends out a plurality of discrete IDs in allocating a discrete ID to each terminal device.

In this case, each terminal device cannot judges on which discrete CID is sent to the terminal device. To solve this problem, according to the present embodiment, the base station 101 selects the discrete CID corresponding to a combination of a Ranging code and a transmission area, which are sent from a terminal device, out of the group of discrete CIDs (step S9a) according to the corresponding list shown in FIG. 13, and sends the selected CID to the terminal device.

The terminal device also recognizes the corresponding list in FIG. 13, thus be able to recognize a received discrete CID as the one sent to the terminal device by referring to the Ranging code and transmission area sent to the base station.

The above fifth embodiment allows the base station to distinct one CID from another in a simple manner even if terminal devices send line request signals to the base station at the same timing.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A communication system comprising:
a base station having a processor that processes a physical layer using a given data format; and
terminal devices each using an up-link line allocated by the base station,
wherein the base station and each terminal device communicate with each other by an orthogonal frequency division multiplexing method, and by using a frame comprising a first subframe for a down-link line, on which a preamble signal and a broadcast signal including down-link allocation information and up-link allocation information are provided, and a second subframe for the up-link line, on which a bandwidth request signal and an up-link data burst are provided,
wherein the base station comprises:
a transmitter which sends out periodically a preamble signal including a synchronous signal with which a terminal device synchronizes, and sends out a vacant discrete connection identifier, which identifies a vacant up-link line through which the terminal device sends data to the base station when the base station receives an up-link line request from the terminal device, and
each of the terminal devices comprises:
a storage which is synchronized with the preamble signal from the base station to store a discrete connection identifier which is being used and is provided in the broadcast signal;
a transmitter which sends an up-link line request code corresponding to a device number of the terminal device, as the up-link line request to the base station; and
a detector which recognizes the up-link line allocation information sent from the base station, as a reply to the up-link line request, to distinguish the stored discrete connection identifier from a discrete connection identifier added by the up-link line allocation information received from the base station in a predetermined number of frames later and to determine the added discrete connection identifier distinguished from the stored discrete connection identifier, as aimed at the terminal device, and
wherein the transmitter of the terminal device sends out data by using a line burst area designated by the added discrete connection identifier, and retransmits an up-link line request when the terminal device detector fails to recognize any connection identifier aimed at the terminal device.

2. The communication system according to claim 1, wherein
the terminal device adds the recognized discrete connection identifier aimed at the terminal device and the terminal device's number to a first up-link line burst when sending the first up-link line burst to the base station after recognizing the discrete connection identifier aimed at the terminal device.

3. The communication system according to claim 2, wherein
the base station receives and recognizes the discrete connection identifier aimed at the terminal device and the terminal device's number, the discrete connection identifier and terminal device's number being sent from the terminal device, and adds a discrete connection identifier aimed at the terminal device to down-link line allocation information in a broadcast signal so as to send discrete data to the terminal device.

4. The communication system according to claim 1, wherein the transmitter sends an up-link line request to the base station on the basis of an up-link line request code and a transmission area that correspond to location information of the terminal device.

5. The communication system according to claim 1, wherein
the transmitter of the base station sets a vacant discrete connection identifier according to a numerical order of identifiers and sends the set vacant discrete connection identifier to the terminal device.

6. The communication system according to claim 1, wherein the transmitter of the base station sends a plurality of discrete connection identifiers to the terminal device, the identifiers being grouped in correspondence to up-link line request codes and transmission areas, when sending a vacant discrete connection identifier to the terminal device, and wherein the terminal device recognizes a discrete connection identifier aimed at the terminal device among the received group of discrete connection identifiers by referring to the up-link line request codes and the transmission areas.

7. In a communication system including a base station having a processor that processes a physical layer using a given data format; and terminal devices each using an up-link line allocated by the base station, wherein the base station and each terminal device communicate with each other by an orthogonal frequency division multiplexing method and by a frame comprising a first subframe for a down-link line, on which a preamble signal and a broadcast signal including down-link allocation information and up-link allocation information are provided, and a second subframe for the up-link line, on which a bandwidth request signal and an up-link data burst are provided,
a method for allocating an up-link line comprising:
from the base station, sending out periodically a preamble signal which includes a synchronous signal with which a terminal device synchronizes, and sending out a vacant discrete connection identifier, which identifies a vacant up-link line through which the terminal device sends data to the base station when the base station receives an up-link line request from the terminal device; and
in each of the terminal devices,
synchronizing with a synchronous signal included in the preamble signal transmitted from the base station to store a connection identifier which is being used and is provided in the broadcast signal;

sending an up-link line request code corresponding to a device number of the terminal device, as the up-link line request to the base station;

recognizing the up-link line allocation information sent from the base station, as a reply to the up-link line request;

distinguishing the stored connection identifier from a connection identifier added by the up-link line allocation information received from the base station in a predetermined number of frames later;

determining the added connection identifier distinguished from the stored connection identifier, as aimed at the terminal device;

sending out data by using a line burst area designated by the added connection identifier; and resending the up-link line request when a detector fails to recognize the connection identifier aimed at the terminal device.

* * * * *